United States Patent
Chen et al.

(10) Patent No.: US 7,953,418 B2
(45) Date of Patent: May 31, 2011

(54) METHOD FOR ALLOCATING SPATIAL RADIO RESOURCE IN COMMUNICATION SYSTEM

(75) Inventors: Po-Han Chen, Taichung County (TW); Ching-Yao Huang, Hsinchu (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 357 days.

(21) Appl. No.: 12/255,676

(22) Filed: Oct. 22, 2008

(65) Prior Publication Data

US 2009/0135770 A1    May 28, 2009

Related U.S. Application Data

(60) Provisional application No. 60/990,627, filed on Nov. 28, 2007.

(51) Int. Cl.
    *H04Q 7/20*      (2006.01)
(52) U.S. Cl. ............... 455/452.2; 370/329; 370/230; 455/102; 455/453; 455/63.4
(58) Field of Classification Search ............... 455/452.2; 340/422; 370/329
See application file for complete search history.

(56) References Cited

U.S. PATENT DOCUMENTS

| | | | | |
|---|---|---|---|---|
| 6,757,542 B2 * | 6/2004 | Bruin et al. | ............... | 455/453 |
| 6,771,598 B1 * | 8/2004 | Andrews | ............... | 370/230 |
| 7,043,210 B2 * | 5/2006 | Zhu et al. | ............... | 455/102 |
| 7,136,624 B2 * | 11/2006 | Ofuji et al. | ............... | 455/63.4 |

OTHER PUBLICATIONS

Chiussi, F. er al., "Achieving High Utilization in Guaranteed Services Networks Using Early-Deadline First Scheduling," Proceedings of the 6th IEEE/IFIP International Workshop on Quality of Service pp. 209-217 (1998).*
Pabst, R. Ellenbeck, J. Schinnenburg, M. Hoymann, C., System Level Performance of Cellular WiMAX IEEE 802.16 with SDMA-enhanced Medium Access, Mar. 11-15, 2007.
Hujun Yin ; Hui Liu , Performance of space-division multiple-access (SDMA) with scheduling, Oct. 2002.
Svedman, P. Cimini, L.J. Bengtsson, M. Wilson, S.K. Ottersten, B., Exploiting Temporal Channel Correlation in Opportunistic SD-OFDMA, Jun. 2006.
Correlation model for shadow fading in mobile radio systems, Nov. 7, 1991.
cdma2000 Evaluation Methodology Revision 0.
Bellofiore, S. Balanis, C.A. Foutz, J. Spanias, A.S., Smart-Antenna Systems for Mobile Communication Networks Part I: Overview and Antenna Design, Jun. 2002.

* cited by examiner

*Primary Examiner* — Charles Shedrick
(74) *Attorney, Agent, or Firm* — Winston Hsu; Scott Margo

(57) ABSTRACT

A method for allocating a spatial radio resource in a communication system includes: determining a threshold according to at least a parameter of the communication system; determining whether at least one wireless communication apparatus in the communication system is a candidate being capable of utilizing the spatial radio resource according to the threshold; scheduling priorities for a plurality of wireless communication apparatuses each being the candidate; and allocating the spatial radio resource according to the priorities of the wireless communication apparatuses each being the candidate.

15 Claims, 4 Drawing Sheets

METHOD FOR ALLOCATING SPATIAL RADIO RESOURCE IN COMMUNICATION SYSTEM

CROSS REFERENCE TO RELATED APPLICATIONS

This application claims the benefit of U.S. provisional application No. 60/990,627, which was filed on Nov. 28, 2007.

BACKGROUND

The invention relates to a method for allocating a spatial radio resource in a communication system, and more particularly, to a method for allocating radio beams to specific users that have poor communication conditions.

Conventionally, radio resource managements in wireless communications manage radio resources in time and frequency domains. With the development of adaptive antenna systems (AAS), utilization of spatial radio resources is becoming more and more realizable, and managing the spatial radio resources is therefore increasingly important. For example, the standards of IEEE 802.16 family adopt AAS as an option to enhance cell capacity and coverage. The feature of AAS is its ability to reduce interference by steering the beam to a specific user. As a result the signal-to-interference-and-noise ratio (SINR) could be enhanced.

With a more advanced application of AAS, spatial division multiple access (SDMA), multiple beams can support multiple users at the same time. FIG. 1 is an illustration of a wireless communication system adopting SDMA. In a cell C1, a base station BS1 forms and allocates beams B1, B2, and B3 to mobile stations MS1, MS2, and MS3, respectively. Since the beams B1, B2, and B3 do not interfere with each other, the mobile station MS1, MS2, and MS3 can access the radio resource at the same time and frequency in the cell C1. In this way, the spectral efficiency of the wireless communication system is high, and the cell capacity can be significantly improved. In addition, interference suppression and SINR enhancement can be achieved. Furthermore, the frequency reuse factor, which is a well known method of reducing the interference with the tradeoff of the band width efficiency, can be increased. Since the main purpose of applying AAS is to suppress the interference, the interference level might be decreased by beam-forming under the same frequency reuse factor.

Usually, SDMA is combined with other multiple access schemes such as time division multiple access (TDMA) or orthogonal frequency division multiple access (OFDMA). Some scheduling algorithms for managing the radio resources have been proposed, e.g. the spatial grouping algorithm and the SDMA/TDMA scheduling algorithm. The conventional scheduling algorithms, however, fail to support poor quality users in the communication system with beam-forming, and thereby, quality of service (QoS) of the communication system cannot be guaranteed and improved.

SUMMARY

To solve the above-mentioned problems, the invention provides a method for allocating a spatial radio resource in a communication system. The method includes the following steps: determining a threshold according to at least a parameter of the communication system; determining whether at least one wireless communication apparatus in the communication system is a candidate capable of utilizing the spatial radio resource according to the threshold; scheduling priorities for a plurality of wireless communication apparatuses each being potential candidates; and allocating the spatial radio resource according to the priorities of the wireless communication apparatuses each being potential candidates.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
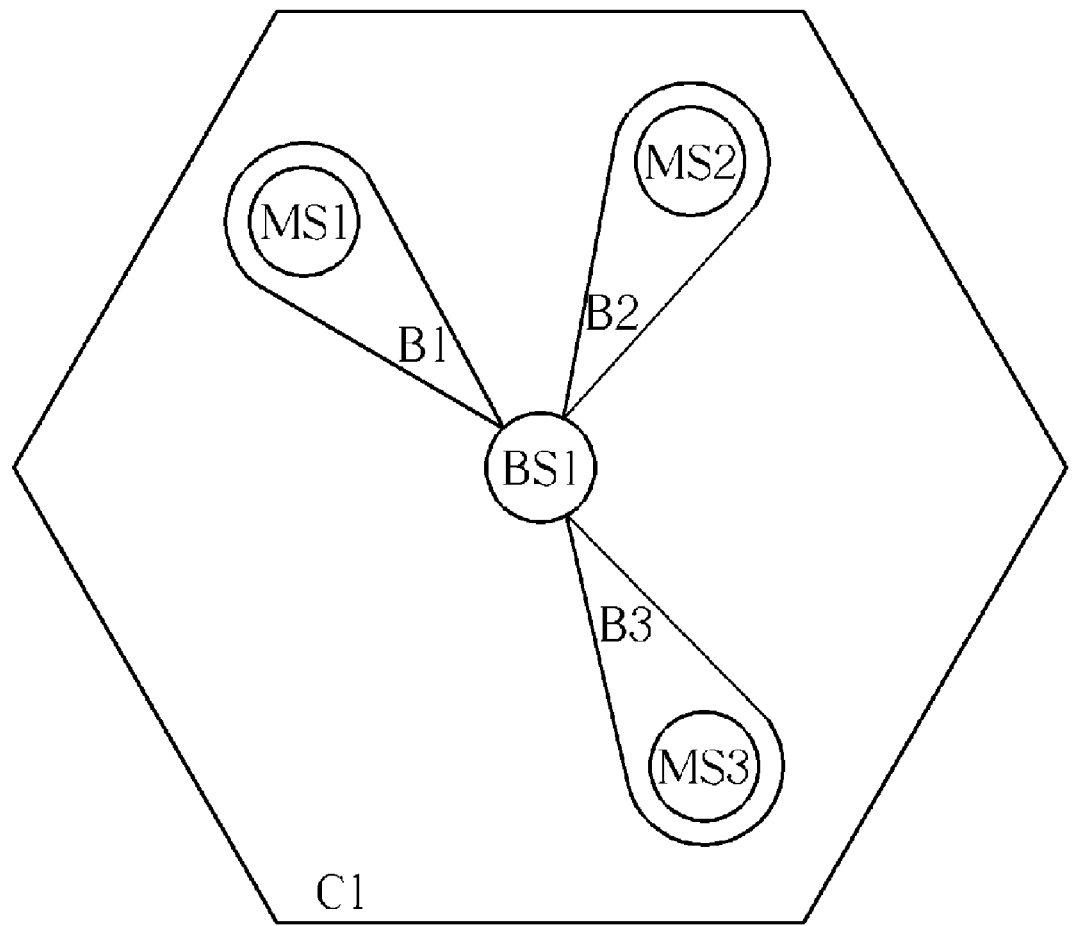
FIG. 1 is an illustration of a wireless communication system adopting SDMA.
Figure 2:
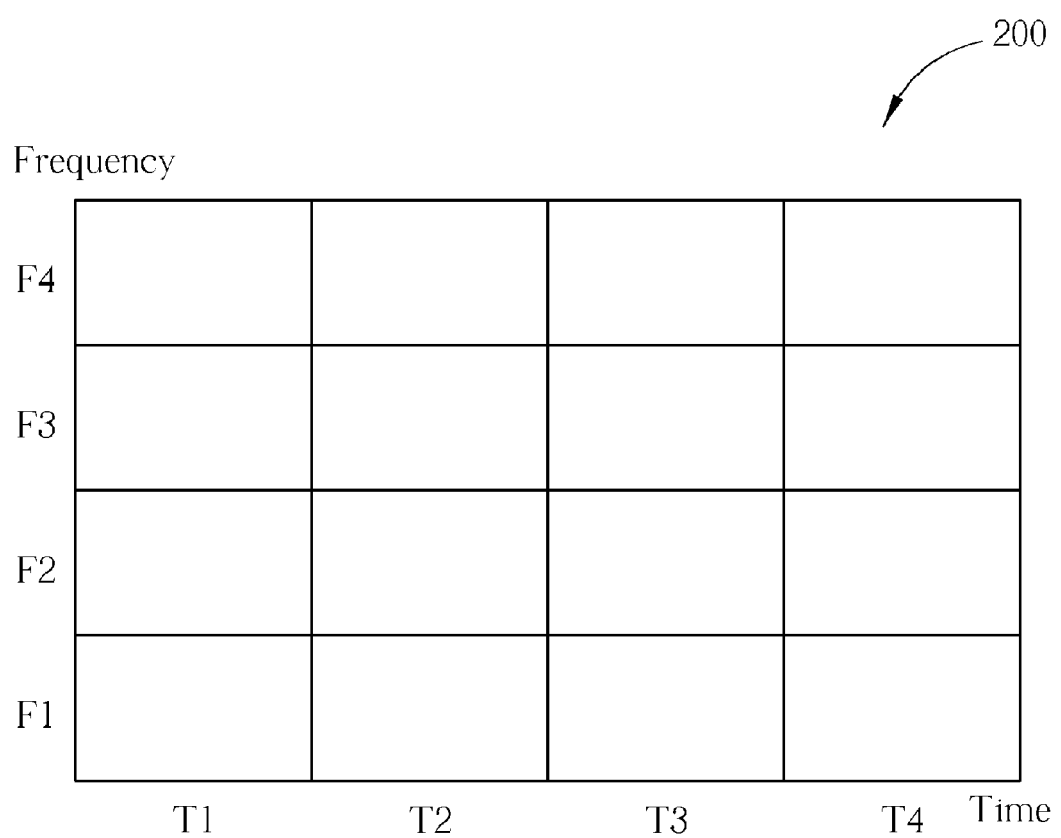
FIG. 2 illustrates a radio resource unit pool for a wireless communication system adopting time division multiple access (TDMA) and orthogonal frequency division multiple access (OFDMA).

In wireless communication systems, e.g. Worldwide Interoperability for Microwave Access (WiMAX) system, Global System for Mobile communications (GSM), etc., a base station (BS) usually serves a plurality of wireless communication apparatuses in a small area (e.g. in a hexagonal grid cell) at the same time. To avoid interference and increase cell capacity, the BS has to manage the radio resources for serving the wireless communication apparatuses well. FIG. 2 illustrates a radio resource unit pool 200 for a wireless communication system adopting time division multiple access (TDMA) and orthogonal frequency division multiple access (OFDMA). The radio resource unit pool 200 comprises time and frequency domain radio resources, and indicates which radio resource units can be utilized during one transmission period (e.g. during a frame time). As shown in FIG. 2, the frequency domain radio resources comprise 4 orthogonal frequency units F1-F4, and the time domain radio resources comprise 4 non-overlapping time slots T1-T4. A data unit, e.g. a packet, can be transmitted between a BS and a wireless communication apparatus (e.g. a mobile station, MS) by utilizing a radio resource unit, e.g. utilizing a frequency unit F1 at time slot T1.

Figure 3:
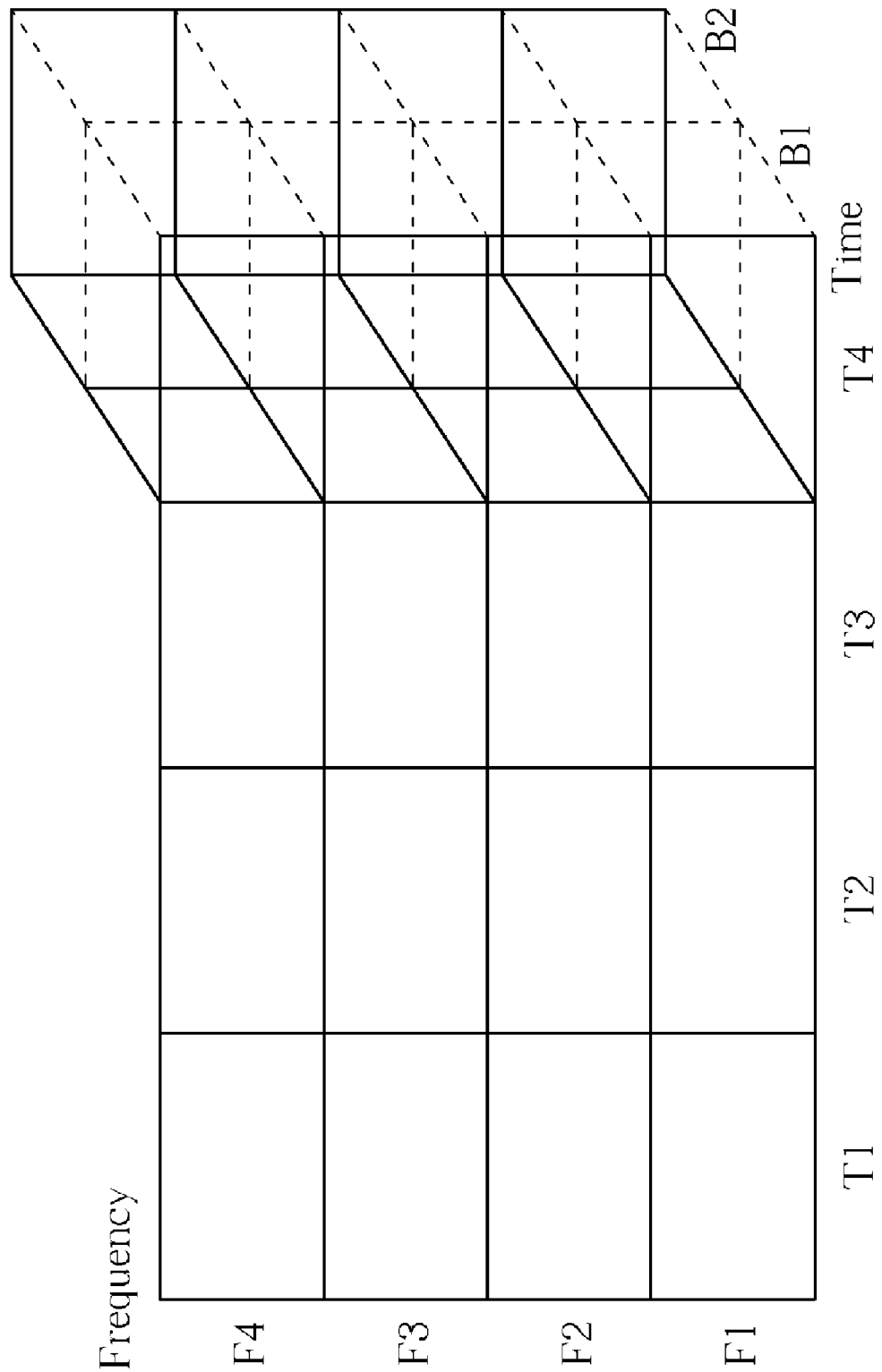
FIG. 3 illustrates a radio resource unit pool for a wireless communication system adopting TDMA, OFDMA, and spatial division multiple access (SDMA).

FIG. 3 illustrates a radio resource unit pool 300 for a wireless communication system adopting TDMA, OFDMA, and spatial division multiple access (SDMA). The radio resource unit pool 300 indicates which radio resource units can be utilized during one transmission period (e.g. during a frame time). During time slots T1-T3, the radio resource unit pool 300 comprises time and frequency domain radio resources, which is similar to the radio resource unit pool 200. At time slot T4, except for the time and frequency domain radio resources, the radio resource unit pool 300 further comprises spatial radio resources B1 and B2. The spatial radio resource B1 and B2 can be two spatial separable beams formed by adaptive antenna system (AAS) of the BS. The duration during time slots T1-T3 can be referred to as a non-AAS zone, and the time slot T4 can be referred to as an AAS zone. Usually, the bandwidth in the AAS zone is much narrower than the bandwidth in the non-AAS zone. For example, the bandwidth in the AAS zone might be 15° only, and the bandwidth in the non-AAS zone might be 120°. A first data unit and a second data unit can be transmitted from the BS to two different wireless communication apparatuses by utilizing the same frequency unit F1 at the same time slot T4 via beams B1 and B2, respectively. Compared to each time slot of time slots T1-T3, double data units can be transmitted during time slot T4.

Allocating the non-AAS zone at the beginning of the transmission period has the advantage that, while a wireless communication apparatus enters the communication area controlled by the BS, the wireless communication apparatus can register to the BS in a conventional procedure without considering AAS. Please note that the AAS zone and non-AAS zone can be interlaced in the transmission period, e.g. allocating a first non-AAS zone at the beginning of the transmission period, allocating a first AAS zone subsequent to the first non-AAS zone, allocating a second non-AAS zone subsequent to the first AAS zone, and allocating a second AAS zone subsequent to the second non-AAS zone.

In one embodiment, the transmission period being a frame time is divided into a non-AAS zone is allocated at the beginning and an AAS zone is allocated subsequent to the non-AAS zone. The duration of the non-AAS zone is three times of the duration of the AAS zone. The ratio of the non-AAS zone and the AAS zone, or (in other words) the threshold boundary between the non-AAS zone and the AAS zone, can be determined according to at least a parameter, such as a quality of service (QoS), a signal-to-interference-and-noise ratio (SINR), a burst report, a real-time wireless communication apparatus report of the communication system, or other design requirements. For example, while the QoS indicates that the amount of poor quality users increases, the BS can reduce the duration of the non-AAS zone and increase the duration of the AAS zone to allow more poor quality users to be served in the AAS zone. The threshold boundary can be determined dynamically, since the communication environment varies rapidly in wireless communication systems. The threshold boundary can be determined each frame or each plurality of frames according to different requirements.

In one embodiment, a plurality of data units queued in the BS are waiting to be transmitted to a plurality of wireless communication apparatuses via a radio resource unit. A data unit can be a packet or other formats of data. The BS determines which packets are transmitted in the latest frame time and via which radio resources they are transmitted. Each packet has its own deadline. If a packet is not transmitted on time, the packet is a delay packet. The greater the number of delay packets are, the worse the QoS of the communication system gets. For example, in a voice over internet protocol (VoIP) application, a delay packet may result in lags during conversation. In a file transfer protocol (FTP) application, the delay packet may decrease the throughput. The dead line of the packet is defined as follows:

$$\text{deadline} = DB - \text{Age} - T_t \quad \text{Equation (1)}$$

where DB denotes a delay bound, which is determined and well defined according to different applications, e.g. 20 ms for the VoIP application, Age is the time the packet stays in the MAC layer of the BS, and $T_t$ is an estimated transmission time for the packet from the BS to the wireless communication apparatus. In another embodiment, for non-real-time services, a soft delay bound is used as the delay bound DB and is defined as follows:

$$\text{soft delay bound} = \frac{\text{packet size}}{\text{minimum reserved traffic rate}} \quad \text{Equation (2)}$$

Figure 4:
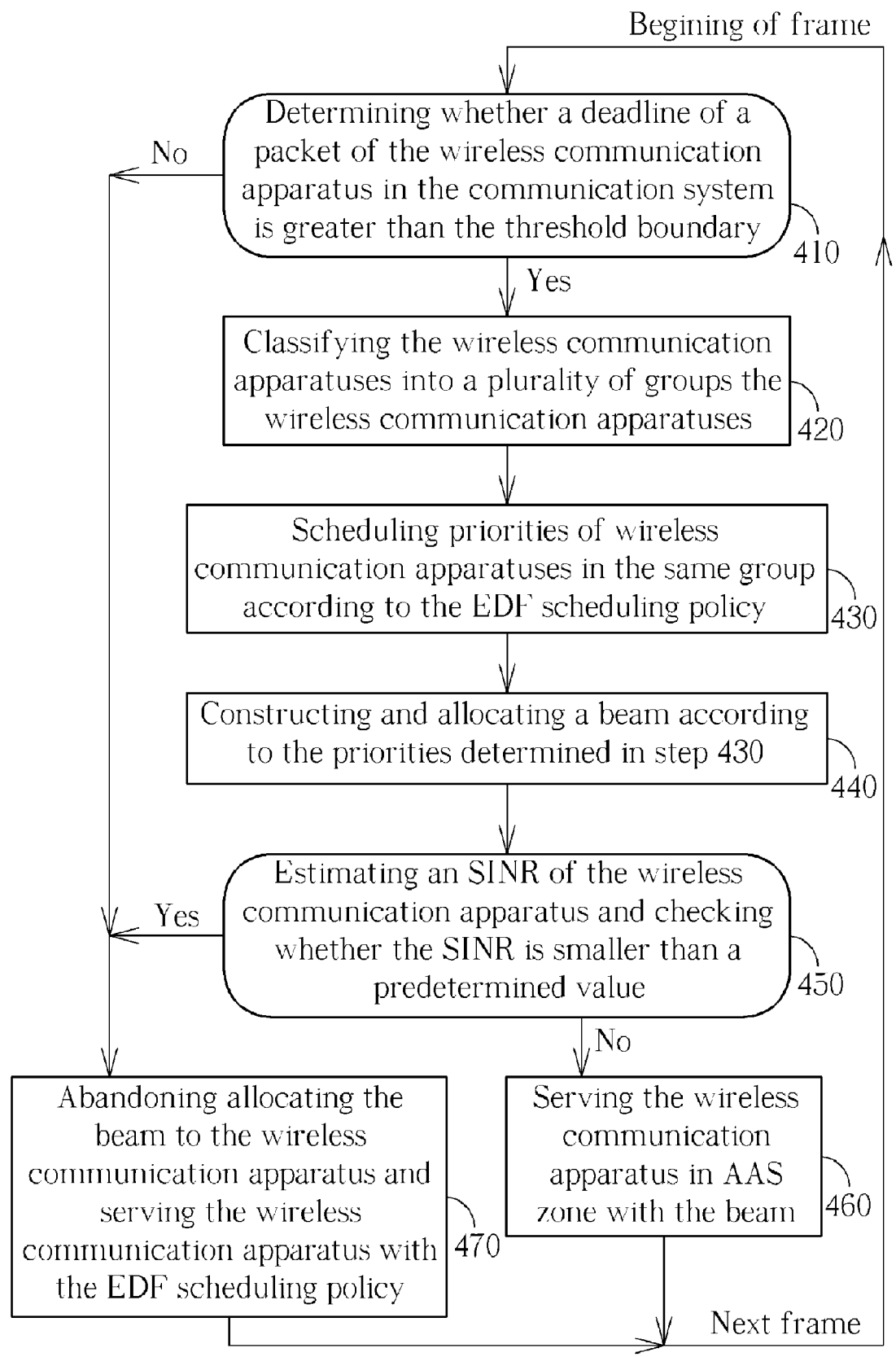
FIG. 4 is a flowchart of a method for allocating a spatial radio resource in a communication system according to an embodiment of the invention.

In conventional communication systems, an early dead first (EDF) scheduling policy is commonly used, where packets with earlier deadlines should have higher priority. The EDF scheduling policy, however, fails to consider the wireless communication apparatus under poor communication conditions, thus QoS of the communication system cannot be guaranteed. FIG. 4 is a flowchart of a method for allocating the spatial radio resource in the communication system according to an embodiment of the invention. The method mainly aims at supporting the wireless communication apparatus under poor communication conditions with beam-forming and scheduling the priority thereof. The method comprises the following steps:

Step 410: determine whether a deadline of a packet of the wireless communication apparatus in the communication system is greater than the threshold boundary, if yes, proceed to step 420, if not, proceed to step 470;

Step 420: classify the wireless communication apparatuses into a plurality of groups of wireless communication apparatuses;

Step 430: schedule priorities of wireless communication apparatuses in the same group according to the EDF scheduling policy;

Step 440: construct and allocate a beam according to the priorities determined in step 430;

Step 450: estimate an SINR of the wireless communication apparatus being allocated the beam and check whether the SINR is smaller than a predetermined value, if not, proceed to step 460, if yes, proceed to step 470;

Step 460: serve the wireless communication apparatus in AAS zone with the beam;

Step 470: abandon allocating the beam to the wireless communication apparatus and then serve the wireless communication apparatus with the EDF scheduling policy.

In step 410, the BS determines whether at least one wireless communication apparatus in the communication system is a candidate capable of utilizing the spatial radio resource according to the boundary threshold. The BS checks the queued packets. If a deadline of a packet is greater than the threshold boundary between the non-AAS zone and the AAS zone, the BS determines the wireless communication apparatus receiving the packet is the candidate. If a deadline of a packet is smaller than the threshold boundary, the packet should be transmitted at the non-AAS zone for preventing delay, and hence, is not appropriate to be the candidate, and the wireless communication apparatus receiving the packet should be scheduled with EDF scheduling policy, i.e. the method proceeds to step 470.

In step 420, the BS schedules priorities for a plurality of wireless communication apparatuses each being the candidate, and classifies the wireless communication apparatuses each being the candidate into a plurality of groups of wireless communication apparatuses according to SINRs or modulation schemes of the wireless communication apparatuses. For guaranteeing the QoS, the BS should give those wireless communication apparatuses under poor communication conditions higher priority. Serving these wireless communication apparatuses with beam-forming has higher benefits or gains than serving wireless communication apparatuses under better communication conditions, since serving wireless communication apparatuses under poor communication conditions with beam-forming will greatly improve the communication conditions thereof. For example, a first wireless communication apparatus and a second wireless communication apparatus are both the candidate. An SINR of the first wireless communication apparatus is greater than an SINR of the second wireless communication apparatus. The BS should determine that the second wireless communication apparatus has a higher priority than the first wireless communication apparatus.

In step 430, for some wireless communication apparatuses having similar communication conditions, serving any one of them might obtain similar benefits. Hence, the EDF scheduling policy can apply to those wireless communication apparatuses for giving urgent packets higher priorities. The BS classifies the wireless communication apparatuses each being the candidate into a plurality of groups according to the SINRs thereof. For example, the BS classifies the wireless communication apparatuses whose SINRs falls between 16-20 dB into a first group, classifies the wireless communication apparatuses whose SINRs falls between 21-25 dB into a second group, and classifies the wireless communication apparatuses whose SINRs falls between 26-30 dB into a third group. Generally speaking, the wireless communication apparatuses in the first group have higher priorities than those in the second and third groups, and the wireless communication apparatuses in the second group have higher priorities than those in the third group. In other words, a wireless communication apparatus belonging to a group mapped to a higher SINR range (e.g. belonging to the third group) has a lower priority than a wireless communication apparatus belonging to a group mapped to a lower SINR range (e.g. belonging to the first or second group). For wireless communication apparatuses in the same group, priorities thereof can be scheduled according to EDF scheduling policy.

The modulation scheme of the wireless communication apparatus usually is highly related to the SINR thereof. For example, while the SINR is 20 dB, the wireless communication apparatus might adopt binary phase-shift keying (BPSK), and while the SINR is 25 dB, the wireless communication apparatus might adopt quadrature phase-shift keying (QPSK). In general, the wireless communication apparatus having a worse SINR might adopt a lower-order modulation scheme to communicate with the BS. Hence, classifying the wireless communication apparatuses each being the candidate into a plurality of groups according to modulation schemes is similar to classifying those according to the SINRs thereof. Thus, the BS should determine that a wireless communication apparatus having a higher-order modulation scheme (e.g. QPSK) has a lower priority than a wireless communication apparatus having a lower-order modulation scheme (e.g. BPSK). Similarly, priorities of wireless communication apparatuses having the same modulation scheme can be scheduled according to the EDF scheduling policy.

In step 440, the BS constructs and allocates a beam to a wireless communication apparatus according to the priorities determined in step 430, if any. Since the BS can merely construct limited beams, the BS first allocates the limited beams to a wireless communication apparatus whose priority is higher until all the limited beams been allocated.

In step 450, for ensuring the effectiveness of beam-forming, the BS estimates an SINR of the wireless communication apparatus being allocated the beam, and checks whether the SINR is smaller than a predetermined value. If the estimated SINR is smaller than the predetermined value, allocating a beam to the wireless communication apparatus does not significantly improve the SINR and communication conditions thereof. The BS can abandon allocating the beam to the wireless communication apparatus and then serve the wireless communication apparatus with the EDF scheduling policy, i.e. the method proceeds to step 470. Furthermore, the BS can release the beam to other wireless communication apparatuses. Please note that the predetermined value is a criterion for measuring the effectiveness of beam-forming, and can be replaced with other limits such as the estimated SINR should be improved to a certain extent so that an estimated modulation scheme of the wireless communication apparatus can be improved to a higher-order modulation scheme. For example, before beam-forming, the modulation scheme is BPSK. If the estimated modulation scheme does not improve to QPSK or other higher-order modulation schemes, the BS can abandon allocating the beam to the wireless communication apparatus.

In addition, for ensuring the allocated beams do not interfere with each other, the BS checks the estimated SINR after allocating a latest beam. For example, the BS allocates a first beam to a first wireless communication apparatus having a higher priority, wherein the first wireless communication apparatus is selected from the wireless communication apparatuses each being the candidate. Then, the BS estimates a first SINR of the first wireless communication apparatus. Next, the BS allocates a second beam to a second wireless communication apparatus having a lower priority, wherein the second wireless communication apparatus is also selected from the wireless communication apparatuses each being the candidate. The BS checks and estimates whether the first SINR is interfered with by the second beam. If the first SINR is interfered with by the second beam, the BS abandons allocating the second beam to the second wireless communication apparatus and releases the second beam to other wireless communication apparatuses.

In step 460, all the beams have been allocated to the wireless communication apparatuses having poor estimated communication conditions by considering the effectiveness of beam-forming by the BS. The BS determines which packets should be served in the AAS zone with beam-forming. Please note that the method 400 can be operated under a frame basis for adapting to a rapidly varying communication environment, i.e. the method can be operated each frame or each plurality of frames.

To conclude, the methods taught by the above embodiments of the invention can support wireless communication apparatuses with poor communication conditions, and the poor quality users, with beam-forming and ensuring effectiveness of beam-forming. In this way, the QoS of the communication system can be guaranteed and improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for allocating a spatial radio resource in a communication system comprising: determining a threshold according to at least a parameter of the communication system; determining whether at least one wireless communication apparatus in the communication system is a candidate being capable of utilizing the spatial radio resource according to the threshold; scheduling priorities for a plurality of wireless communication apparatuses each being the candidate; and allocating the spatial radio resource according to the priorities of the wireless communication apparatuses each being the candidate, wherein the step of allocating the spatial radio resource comprises: according to the priorities of the priorities of the wireless communication apparatuses each being the candidate, constructing and allocating a beam to at least a wireless communication apparatus selected from the wireless communication apparatuses each being the candidate, estimating an SINR of the wireless communication apparatus being allocated the beam; and when the SINR is smaller than a predetermined value, abandoning allocating the beam to the wireless communication apparatus and then serving the wireless communication apparatus with an EDF scheduling policy.

2. The method of claim 1, wherein the threshold is dynamically determined on a frame basis.

3. The method of claim 1, wherein the threshold is determined according to the parameter, wherein the parameter comprises a Quality of Service (QoS) of the communication system.

4. The method of claim 1, wherein the parameter comprises at least one of a Quality of Service (QoS), a signal-to-interference-and-noise ratio (SINR), a burst report, and a real-time wireless communication apparatus report of the communication system.

5. The method of claim 1, wherein the step of determining whether at least one wireless communication apparatus in the communication system is the candidate comprises:
if a deadline of a packet of the wireless communication apparatus in the communication system is greater than the threshold, determining the wireless communication apparatus is the candidate.

6. The method of claim 5, wherein the deadline equals a delay bound of the packet minus a first time duration and a second time duration, the first time duration is a time period of the packet staying in a MAC layer of a base station of the communication system, and the second time duration is an estimated transmission time for the packet from the base station to the wireless communication apparatus.

7. The method of claim 1, wherein the step of scheduling the priorities of the wireless communication apparatuses comprises:
scheduling the priorities according to SINRs of the wireless communication apparatuses.

8. The method of claim 7, wherein the wireless communication apparatuses include a first wireless communication apparatus and a second wireless communication apparatus, an SINR of the first wireless communication apparatus is greater than an SINR of the second wireless communication apparatus, and the second wireless communication apparatus has a higher priority than the first wireless communication apparatus.

9. The method of claim 7, wherein the wireless communication apparatuses are classified into a plurality of groups according to the SINRs of the wireless communication apparatuses, and priorities of wireless communication apparatuses in a same group are scheduled according to an early deadline first (EDF) scheduling policy.

10. The method of claim 9, wherein each group is mapped to an SINR range, and a wireless communication apparatus belonging to a group mapped to a higher SINR range has a lower priority than a wireless communication apparatus belonging to a group mapped to a lower SINR range.

11. The method of claim 7, wherein the wireless communication apparatuses are classified into a plurality of groups according to modulation schemes of the wireless communication apparatuses, and priorities of wireless communication apparatuses in a same group are scheduled according to an EDF scheduling policy.

12. The method of claim 11, wherein a wireless communication apparatus having a higher-order modulation scheme has a lower priority than a wireless communication apparatus having a lower-order modulation scheme.

13. The method of claim 1 further comprising:
allocating a first beam to a first wireless communication apparatus having a higher priority, wherein the first wireless communication apparatus is selected from the wireless communication apparatuses each being the candidate; estimating a first SINR of the first wireless communication apparatus; allocating a second beam to a second wireless communication apparatus having a lower priority, wherein the second wireless communication apparatus is selected from the wireless communication apparatuses each being the candidate; estimating whether the first SINR is interfered with by the second beam; and when the first SINR is interfered with by the second beam, abandoning allocating the second beam to the second wireless communication apparatus.

14. The method of claim 1, wherein the spatial radio resource is allocated by a base station communicating with the wireless communication apparatuses each being the candidate.

15. The method of claim 1, being operated under a frame basis.

* * * * *